(12) United States Patent
Chang

(10) Patent No.: US 9,186,810 B1
(45) Date of Patent: Nov. 17, 2015

(54) BRACKET ASSEMBLY AND RETAINING DEVICE FOR COLLAPSIBLE STAND

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 14/453,092

(22) Filed: Aug. 6, 2014

(51) Int. Cl.
| | | |
|---|---|---|
| *F16M 1/00* | (2006.01) | |
| *F16M 3/00* | (2006.01) | |
| *F16M 5/00* | (2006.01) | |
| *F16M 7/00* | (2006.01) | |
| *F16M 9/00* | (2006.01) | |
| *F16M 11/00* | (2006.01) | |
| *B27B 27/08* | (2006.01) | |
| *F16B 2/10* | (2006.01) | |
| *F16M 13/02* | (2006.01) | |
| *B27B 27/10* | (2006.01) | |
| *B27B 27/02* | (2006.01) | |

(52) U.S. Cl.
CPC .............. *B27B 27/08* (2013.01); *B27B 27/02* (2013.01); *B27B 27/10* (2013.01); *F16B 2/10* (2013.01); *F16M 13/022* (2013.01)

(58) Field of Classification Search
CPC ........ B27B 27/08; B27B 27/10; B27B 27/02; Y10T 83/727; Y10T 83/7726; Y10T 83/73; F16M 3/00; F16M 11/38; F16M 13/022; F16B 2/10; F16B 13/00
See application file for complete search history.

(56) References Cited

U.S. PATENT DOCUMENTS

| | | | | |
|---|---|---|---|---|
| 4,658,687 A | * | 4/1987 | Haas et al. | 83/438 |
| 5,181,446 A | * | 1/1993 | Theising | 83/438 |
| 6,360,641 B1 | * | 3/2002 | Talesky et al. | 83/438 |
| 2006/0266182 A1 | * | 11/2006 | Balolia | 83/471.3 |
| 2008/0271583 A1 | * | 11/2008 | Chuang | 83/438 |
| 2009/0084238 A1 | * | 4/2009 | Chang | 83/441.1 |
| 2012/0160070 A1 | * | 6/2012 | Cheng | 83/438 |
| 2014/0174273 A1 | * | 6/2014 | Frolov | 83/440 |
| 2014/0182436 A1 | * | 7/2014 | Dammertz | 83/440 |
| 2015/0059546 A1 | * | 3/2015 | Chang | 83/438 |
| 2015/0107428 A1 | * | 4/2015 | Burke | 83/438 |

\* cited by examiner

*Primary Examiner* — Brian Mattei

(57) ABSTRACT

A bracket assembly is provided with a shell, a pivotal first curved member on one end of a recessed shell bottom, a pivotal second curved member on the other end of the shell bottom, a link including a slot, a first pin driven through the first curved member and the slot to fasten the first curved member and the link together, and a third hole at an other end, a cylindrical first actuation member, a cylindrical second actuation member, a second pin for fastening the first actuation member and the link together; a biasing member biased between the first stop member and the first actuation member; and a knob at a cap. A retaining device is also provided so that the sliding tube can slide in a transverse channel of retaining device, thereby adjusting length of the sliding tube.

10 Claims, 19 Drawing Sheets

BRACKET ASSEMBLY AND RETAINING DEVICE FOR COLLAPSIBLE STAND

BACKGROUND OF THE INVENTION

1. Field of the Invention

The invention relates to machine stands and more particularly to a bracket assembly and a retaining device for a collapsible stand for supporting a machine (e.g., circular sawing machine).

2. Description of Related Art

U.S. Publication Number 2006/0272744 to Liu et al. discloses a bracket assembly for a mobile stand having a long beam and a plurality of legs that support the long beam for supporting a machine, the bracket assembly comprising a bracket body mountable on the long beam of the mobile stand; a front clamp mounted in the bracket body, the front clamp having a front stop face contactable with the long beam of the mobile stand; a rear clamp pivoted to the bracket body and corresponding to the front clamp, the rear clamp having a rear stop face contactable with the long beam of the mobile stand, and a guide face opposite to the rear stop face; and a locking control device having an eccentric member and a follower rotatably coupled to the eccentric member, the eccentric member being pivoted to the bracket body and having an operating handle extending out of the bracket body, the follower having a push face kept in contact with the guide face of the rear clamp.

However, when the bracket assembly is mounted on a power tool, an upward or downward of the handle offers a little cam force to the long beam in operation. Thus, the long beam may hit the handle accidentally if the handle is not secured and the handle pivots upward or downward. This is very dangerous especially in cutting.

U.S. Pat. No. 8,528,870 to Liu et al. discloses a retaining device for a stand having a drawable extending rod, the retaining device comprising a base having a through hole for penetration of the extending rod; a shaft inserted in the base; a handle having a cam portion and an eccentric hole through the cam portion, and pivotally mounted on the shaft through the eccentric hole; a retainer moveably mounted in the base and having a receiving hole in which the cam portion of the handle is received such that the retainer is moveable by a pivotal movement of the cam portion of the handle to stop the extending rod in position; and an adjustment unit including the shaft having an eccentric shaft portion passing through the eccentric hole of the handle, and a teeth portion at an end of the eccentric shaft portion, a screw inserted in the shaft and provided with a distal end passing through a retaining hole of the base, a nut screwed to the distal end of the screw, and an elastic member sleeved on the screw and stopped against the base and the shaft; wherein when the screw is tightened, the teeth portion of the shaft is engaged with a teeth hole of the base for preventing the shaft from rotation, and when the screw is loosened, the teeth portion of the shaft is disengaged from the teeth hole of the base by an elastic force of the elastic member for allowing the shaft to be rotatable.

However, an upward or downward of the handle offers a little cam force to the long beam in operation and its positioning effect is poor. Thus, the extending rod may be vibrated by the cam in an urging action. And in turn, it may adversely affect the safety in a cutting operation. Thus, the long beam may hit the handle accidentally if the handle is not secured and the handle pivots upward or downward. This is very dangerous especially in cutting.

Notwithstanding the prior art, the invention is neither taught nor rendered obvious thereby.

SUMMARY OF THE INVENTION

It is therefore one object of the invention to provide a bracket assembly comprising, in combination an elongated shell having an inverted U-shaped longitudinal section and both ends open, the shell including first and second end members, a first stop member disposed across both sides of the first end member and having a first hole, and a second stop member disposed across both sides of the second end member and having a second hole; a first curved member pivotably disposed on one end of a recessed bottom of the shell and including two spaced top extensions engaging the bottom of the shell, and a curved outer surface engaging one bar mounted on a collapsible stand; a second curved member pivotably disposed on the other end of the bottom of the shell and including two spaced top extensions engaging the bottom of the shell, and a curved outer surface engaging an other bar mounted on the collapsible stand; a fastener driven through the second hole of the second stop member to releasably lock the other bar mounted on the stand; a link including a slot at one inclined end, a first pin driven through the first curved member and the slot to fasten the first curved member and the link together, and a third hole at an other end; a cylindrical first actuation member including a cylindrical protrusion at one end, a fourth hole through the protrusion, an axial channel, a plurality of ramps equally spaced on one end surface, and a riser on an outer surface formed with one of the ramps; a cylindrical second actuation member including an axial channel, a plurality of ramps equally spaced on one end surface, a riser on an outer surface formed with both one of the ramps on one end surface and one of the ramps on the other end surface, a fifth hole on an outer surface and communicating with the channel, and an aperture on the outer surface, communicating with the channel, and aligned with the hole wherein the protrusion is put on the other end of the link; a second pin driven through the hole of the first actuation member and the fifth hole of the link to fasten the first actuation member and the link together; a biasing member put on the protrusion and biased between the first stop member and the first actuation member; a first cap secured to the first end member and including a bossed hole projecting inward from a central portion of an outer surface; a knob including a reduction projecting inward, a shaft extending inward from the reduction, and a sixth hole through the shaft and terminating at a peripheral surface of the shaft wherein the shaft is inserted through the bossed hole and the channel of the second actuation member to be proximate to the link, and a joining portion of the reduction and the shaft is urged against the bossed hole; and a third pin driven through the aperture, the sixth hole of the knob, and the fifth hole of the second actuation member to fasten the knob and the second actuation member together; wherein in a locked position, raised portions of the ramps of the second actuation member engage with raised portions of the ramps of the first actuation member, and the first pin is disposed at one end of the slot, one bar is locked by the first curved member, and the other bar is locked by the second curved member; and wherein a pulling of the fastener unlocks the other bar, and a clockwise rotation of the knob causes recessed portions of the ramps of the second actuation member to engage the raised portions of the ramps of the first actuation member, causes the raised portions of the ramps of the second actuation member to engage recessed portions of the ramps of the first actuation member, and moves the first actuation member further away from the first stop member with the biasing member being expanded, the link being pulled outward away from one bar, and the slot moving outward to dispose the first pin in a position other than one end of the slot, thereby unlocking one bar.

It is another object of the invention to provide a retaining device comprising, in combination a housing including an intermediate first transverse hole, a lower transverse channel having a rectangular longitudinal section, an inclined first space defined between the transverse channel and the first transverse hole, a plurality of equally spaced flanges on one end of the transverse channel, an inclined second space parallel to the first space, a third space proximate to upper portions of the first and second spaces, a bend on an intermediate portion of an inclined outer surface of the housing, a bending member at an upper end of the first space, the bending member having a first through hole, and a limiting member spaced from the bend wherein a hollow end of one of two bars of a collapsible stand is configured to put on the flanges in a friction fit; a handle including a bent mounting member having a tab, a second through hole, and an ear member with a second transverse hole; a first biasing member biased between the tab and a bottom of the second space; a hollow member including a first clamping plate and a second clamping plate both on an inner surface wherein the first clamping plate is arranged at about 90-degree angle with respect to the second clamping plate; a fastener driven through the hollow member, a second biasing member, the first through hole of the bending member, and the second through hole of the mounting member with the second biasing member put on the fastener and biased between the hollow member and the bending member; and a side cover including a rectangular opening, a third transverse hole, and a pivot driven through the third transverse hole of the side cover, the second transverse hole of the ear member, and the first transverse hole of the housing to pivotably fasten the ear member and the housing together; wherein the transverse channel is configured to receive a sliding tube having a corresponding longitudinal section passing the opening of the side cover and disposed in the hollow end of one bar; wherein the sliding tube is clamped by both the first and second clamping plates; wherein a portion of the mounting member adjacent to the handle passes through a gap between the bend And the limiting member; and wherein a clockwise pivot of the handle pivots about the pivot, expands the first biasing member, compresses the second biasing member, disengages both the first and second clamping plates from the sliding tube so that the housing is not locked and length of the sliding tube is configured to adjust by continuously pivoting the handle.

The above and other objects, features and advantages of the invention will become apparent from the following detailed description taken with the accompanying drawings.

DETAILED DESCRIPTION OF THE INVENTION

Figure 1:
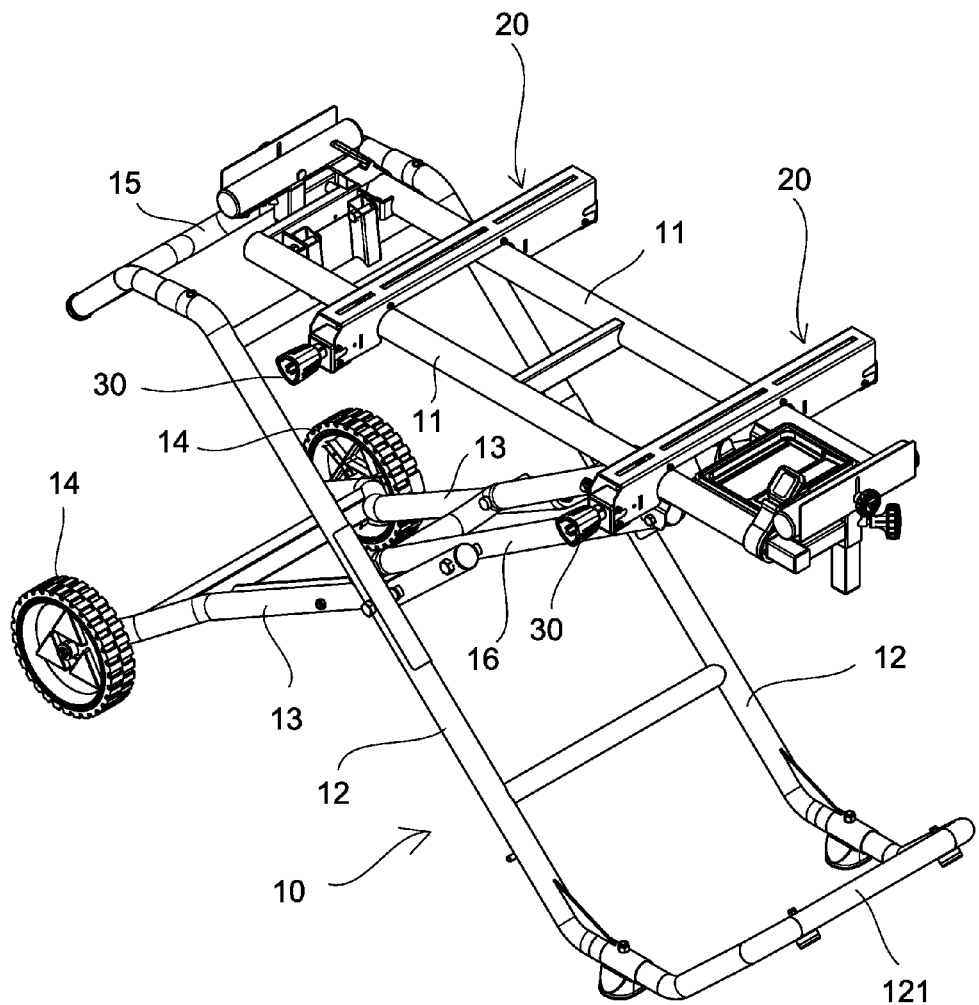
FIG. 1 is a perspective view of a collapsible stand incorporating two bracket assemblies according to a first preferred embodiment of the invention.
Figure 2:
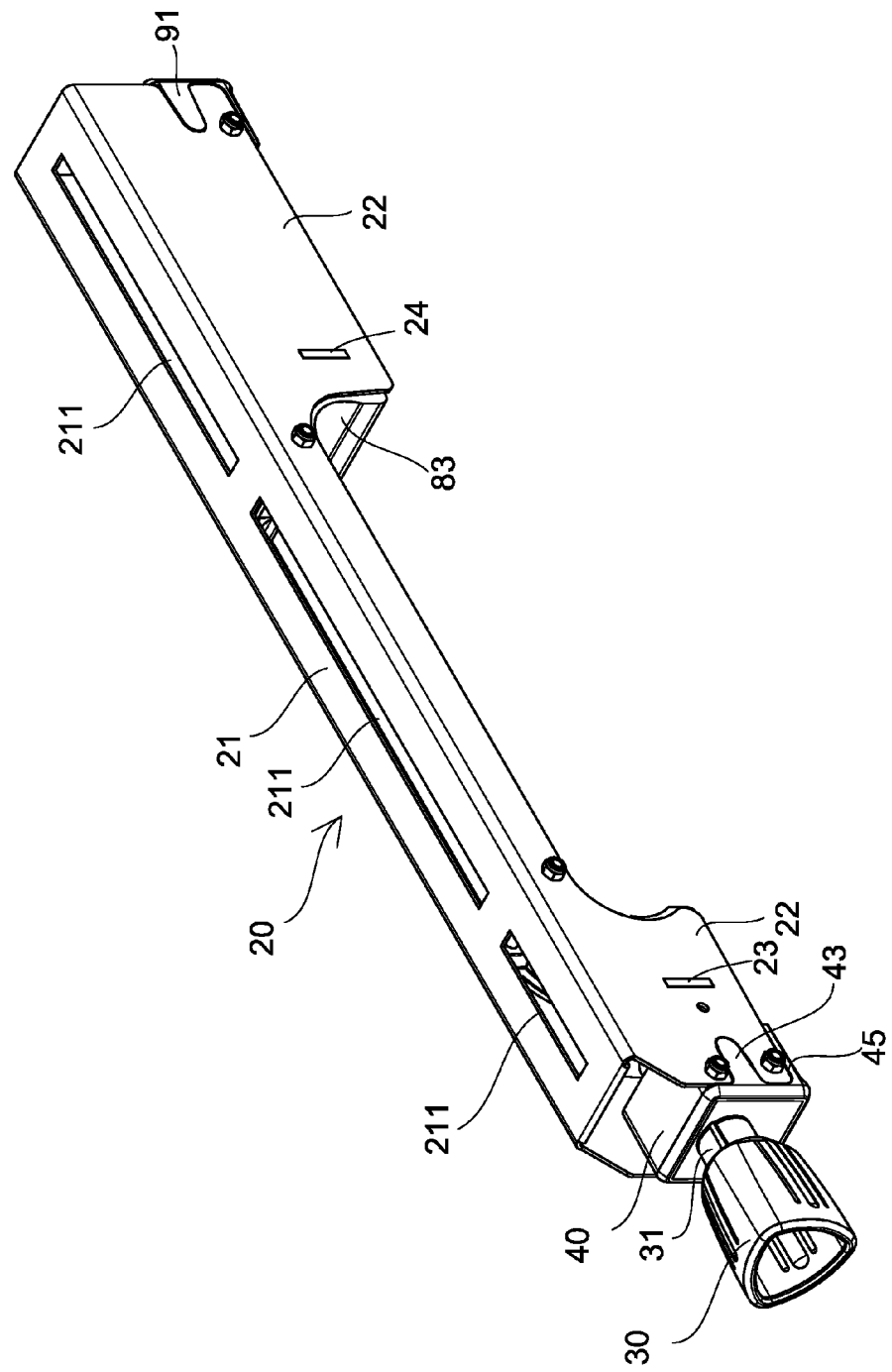
FIG. 2 is a perspective view of the bracket assembly.
Figure 3:
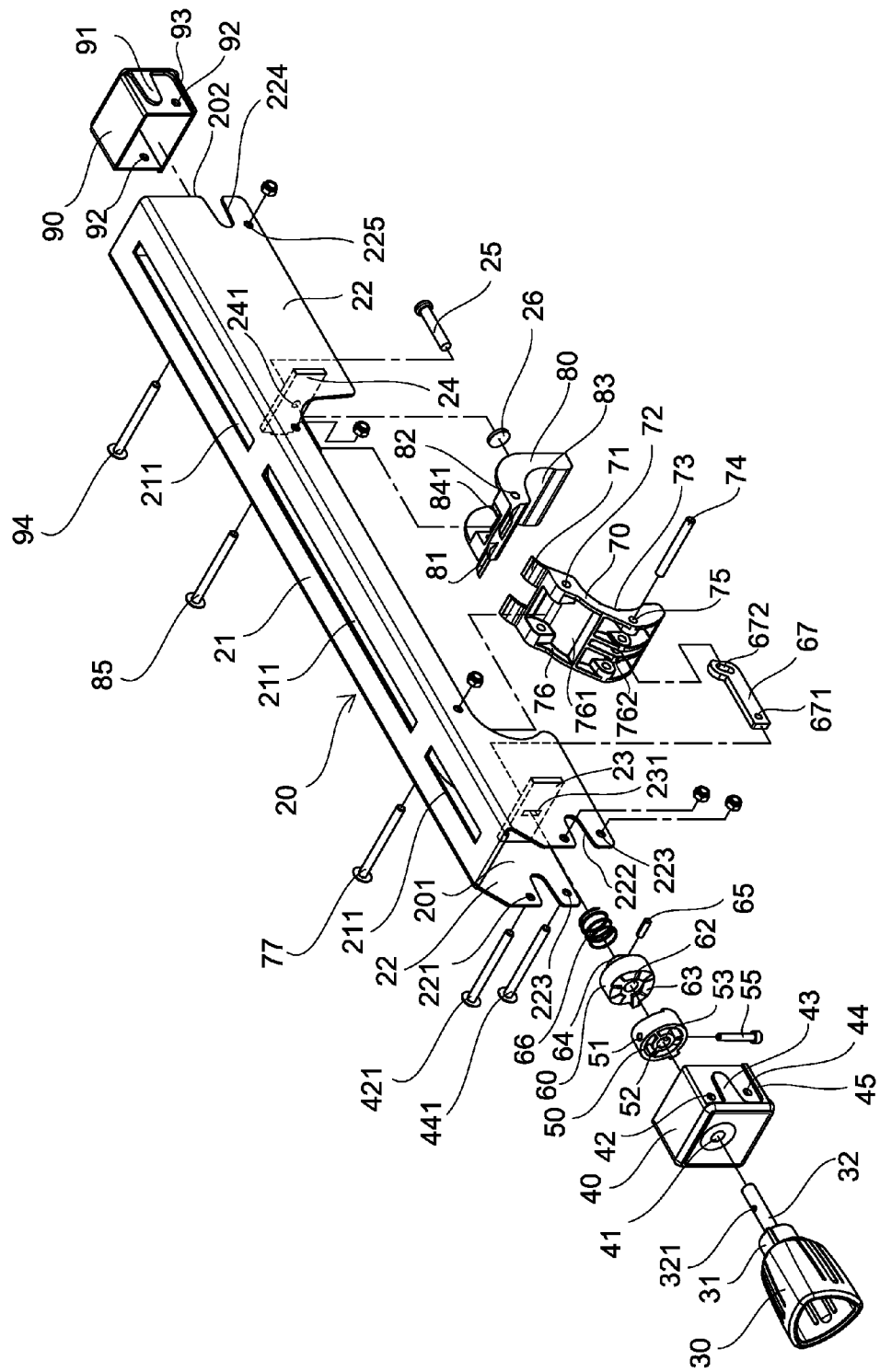
FIG. 3 is an exploded view of the bracket assembly.
Figure 4:
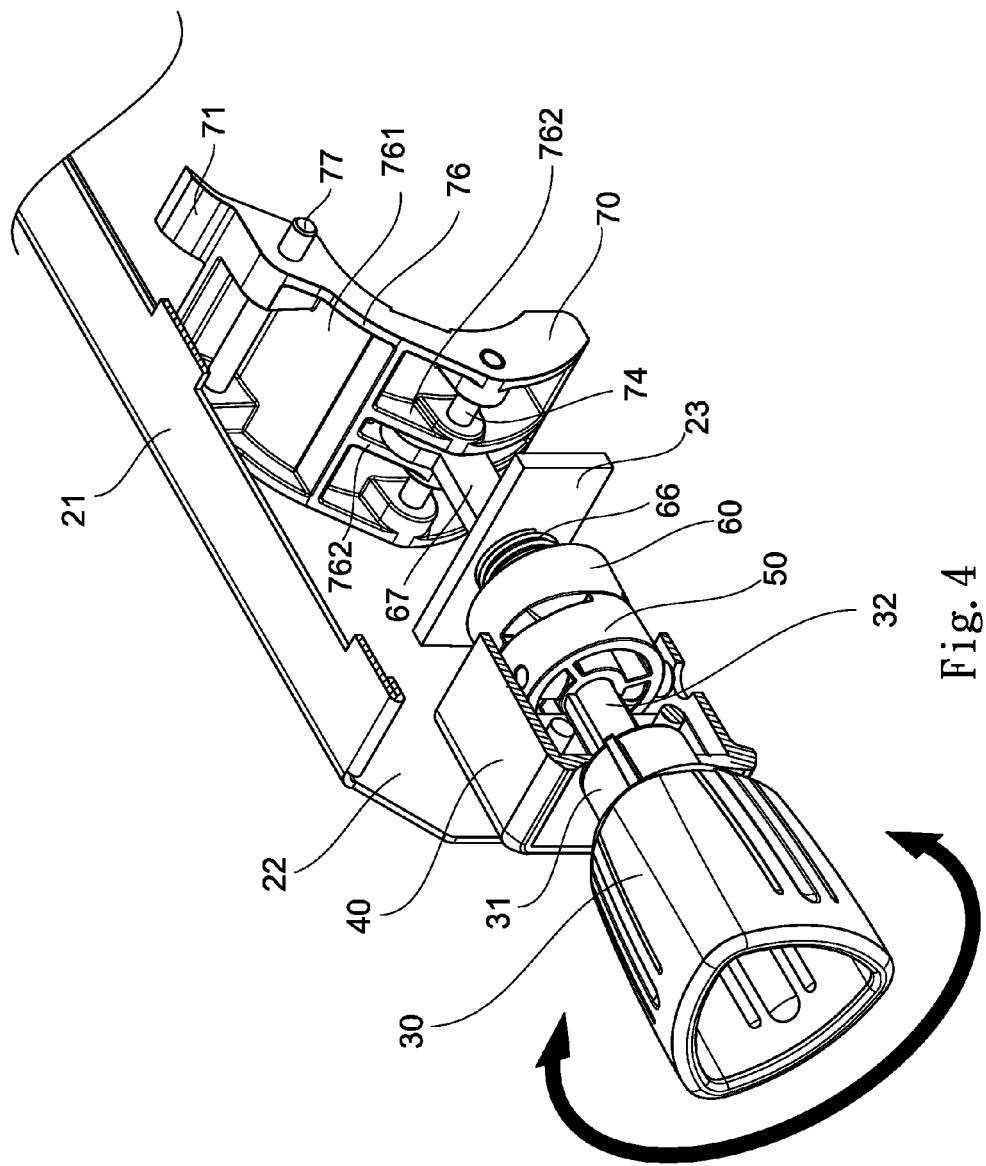
FIG. 4 is a broken away perspective view of the bracket assembly showing clockwise and counterclockwise rotations of the knob.
Figure 5:
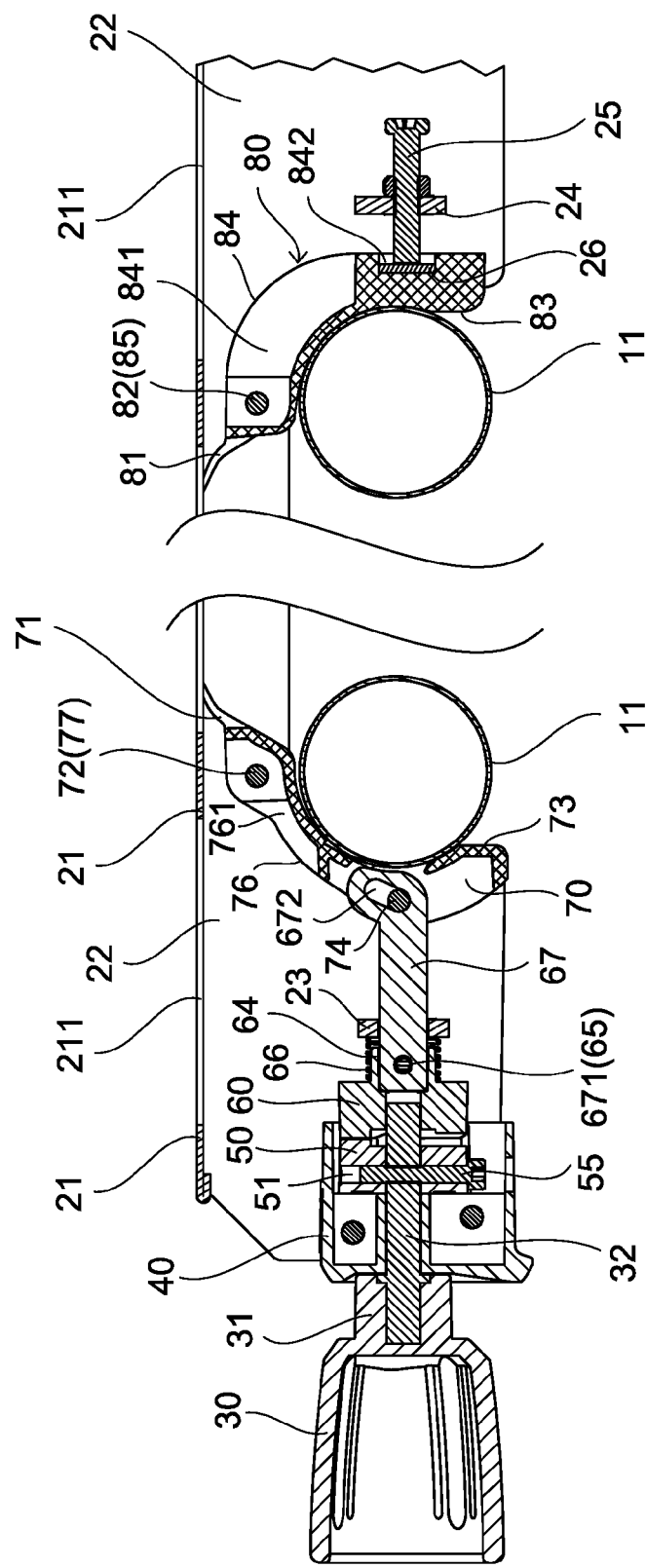
FIG. 5 is a longitudinal sectional view of the bracket assembly.
Figure 6:
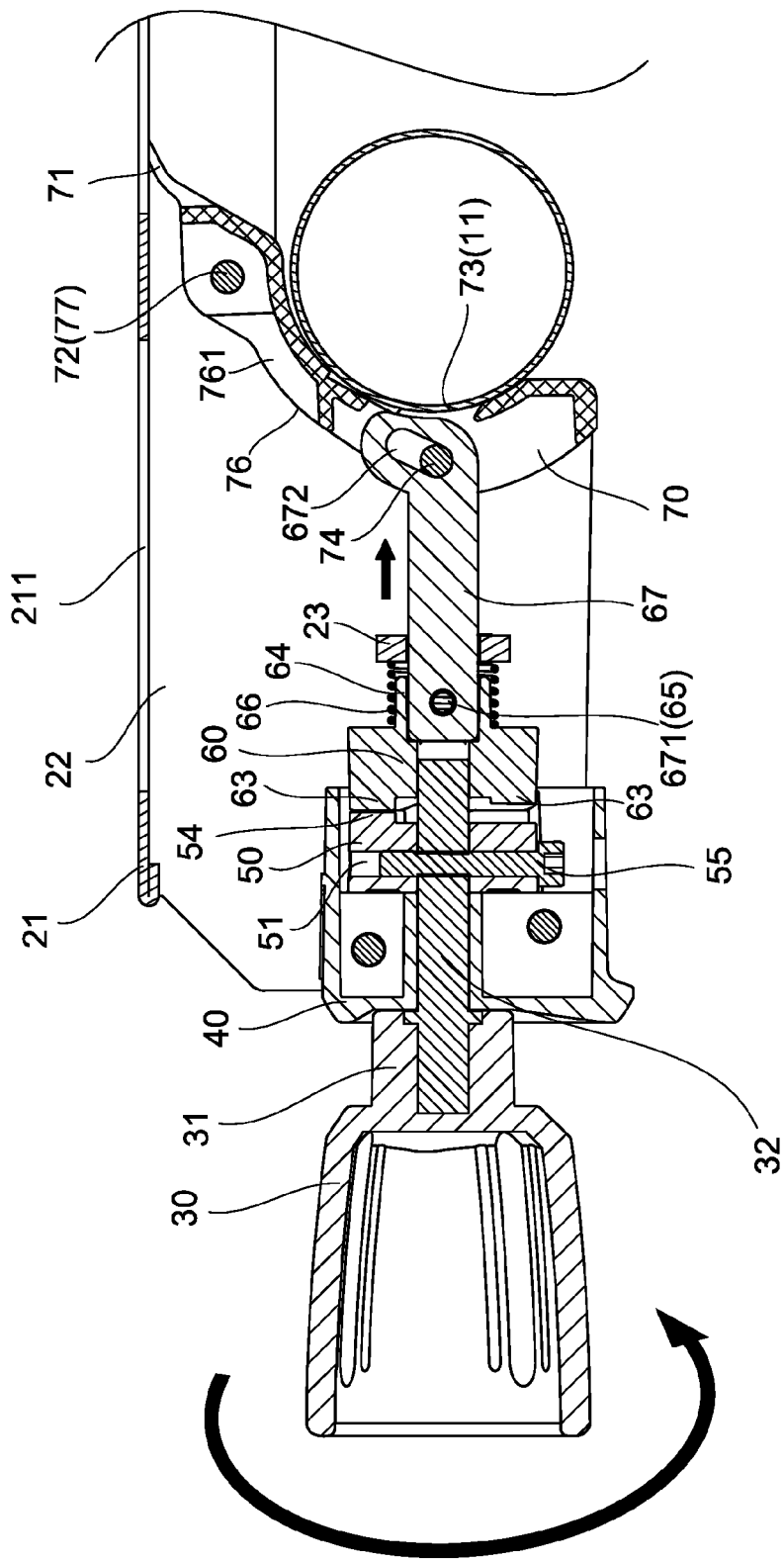
FIG. 6 is an enlarged view of the left portion of FIG. 5 showing a clockwise rotation of the knob to lock the bar.

Referring to FIGS. 1 to 13, a collapsible stand 10 in accordance with a first preferred embodiment of the invention comprises the following components as discussed in detail below.

The stand 10 comprises two parallel first leg elements 12, a handle 15 at one ends of the leg elements 12, a U-shaped support element 121 at the other ends of the leg elements 12, two parallel second leg elements 13 having one ends connected to two wheels 14 respectively and the other ends pivotably secured to intermediate portions of the first leg elements 12 respectively, a U-shaped member 16 secured to two parallel members (not numbered) which are secured to the intermediate portions of the second leg elements 13 respectively, and two upper parallel bars 11 having one ends secured to a cross bar (not numbered) interconnecting the first leg elements 12 proximate to the handle 15, and a bottom pivotably secured to the open ends of the U-shaped member 16.

Two bracket assemblies 20 are slidably provided on the bars 11 and are subjects of the invention as discussed in detail below. Each bracket assembly 20 comprises an elongated shell 21 having an inverted U-shaped longitudinal section and including three aligned elongated slots 211 on a top; two end members 22 wherein one end member 22 includes two opposite first recesses 222, an opening 201 defined between the first recesses 222, and two sets of first hole 221 and second hole 223 on both sides of one end member 22 respectively wherein the first hole 221 is above a top edge of the first recess 222 and the second hole 223 is under the bottom edge of the first recess 222; and the other end member 22 includes two second recesses 224, an opening 202 defined between the second recesses 224, and two opposite third holes 225 under the bottom edges of the second recesses 224; first and second stop members 23, 24 wherein the first stop member 23 is disposed across both sides of one end member 22 and includes a first hole 231, and the second stop member 24 is disposed across both sides of the other end member 22 and includes a second hole 241.

Each bracket assembly 20 further comprises a first curved member 70 disposed on one end of a recessed portion on a bottom and including two spaced top extensions 71, two spaced upper holes 72, a curved outer surface 73 engaged with one bar 11, two spaced lower holes 75, a cavity 761 on an inner surface 76 between the upper holes 72 and the lower holes 75, two opposite ridges 672 on the inner surface 76 corresponding to the lower holes 75, and a pivot 77 driven through the shell 21 and the upper holes 72 to pivotably secure the first curved member 70 and the shell 21 together with the extensions 71 engaged with the bottom of the top surface of the shell 21; a second curved member 80 disposed on the other end of the recessed portion on a bottom and including two spaced top extensions 81, two spaced upper holes 82, a curved outer surface 83 engaged with the other bar 11, a cavity 841 on an inner surface 84 under the extensions 81, a lower well 842 on the inner surface 84 below the cavity 841, and a pivot 85 driven through the shell 21 and the upper holes 82 to pivotably secure the second curved member 80 and the shell 21 together with the extensions 81 engaged with the bottom of the top surface of the shell 21; a disc member 26 fitted in the well 842; and a pin 25 disposed through the second hole 241 to have its end secured to the disc member 26.

Each bracket assembly 20 further comprises a box shaped first cap 90 including two projections 91 on both sides respectively and two seventh holes 92 on both sides respectively wherein the projections 91 are complimentarily disposed in the second recesses 224 and a pin 94 is driven through the third holes 224 and the seventh holes 92 to fasten the first cap 90 and the shell 21 together; and a link 67 including a slot 672 at one inclined end disposed between two ridges 762 of the inner surface 76 of the first curved member 70 under the cavity 761 so as to limit a transverse movement of the link 67 and guide the link 67 along an upward or downward direction, and a third hole 671 at the other end wherein a pin 74 is driven through the lower holes 75, the ridges 762 and the slot 672 to hold the link 67 and the first curved member 70 together. The other end of the link 67 is inserted through the first hole 231 and thus the first stop member 23 is between both ends of the link 67.

Each bracket assembly 20 further comprises a cylindrical first actuation member 60 including a cylindrical protrusion 64 at one end, a fourth hole 641 through the protrusion 64, an axial channel 62, three ramps 63 equally spaced on one end surface, a riser 631 on an outer surface formed with one ramp 63; and a cylindrical second actuation member 50 including an axial channel 52, three ramps 54 equally spaced on one end surface and another three ramps 54 equally spaced on the other end surface, a riser 541 on an outer surface formed with both one ramp 54 on one end surface and one ramp 54 on the other end surface, a fifth hole 51 on an outer surface and communicating with the channel 52, and an aperture 53 on the outer surface, communicating with the channel 52, and aligned with the fifth hole 51 wherein the protrusion 64 is put on the other end of the link 67, a pin 65 is driven through the fourth hole 641 and the third hole 671 to fasten the first actuation member 60 and the link 67 together, a torsion spring 66 is put on the protrusion 64 and biased between the first stop member 23 and the other surface of the first actuation member 60, and one end surface of the first actuation member 60 is engaged with the other end surface of the second actuation member 50.

Each bracket assembly 20 further comprises a box shaped second cap 40 including two upper holes 42 on both sides respectively, two lower holes 44 on both sides respectively, two projections 43 on both sides respectively and each projection 43 disposed between the upper hole 42 and the lower hole 44 of the same side, two protuberances 45 each on a joining line of either side and the bottom, and a bossed hole 41 projecting inward from a central portion of an outer surface; a knob 30 including a reduction 31 projecting inward, a shaft 32 extending inward from the reduction 31, and a sixth hole 321 through the shaft 32 and terminating at a peripheral surface. The shaft 32 is inserted through the bossed hole 41 and the channel 52 to be proximate to channel 62. A pin 55 is driven through the aperture 53, the sixth hole 321, and the fifth hole 51 to fasten the knob 30 and the second actuation member 50 together. The second cap 40 is disposed at the opening 201. A pin 421 is driven through the first hole 221 on one side of one end member 22, the upper holes 42, and the first hole 221 on the other side of one end member 22 and another pin 441 is driven through the second hole 223 on one side of one end member 22, the lower holes 44, and the second hole 223 on the other side of one end member 22 so as to fasten the second cap 40 and the shell 21 together. A shoulder 311 at a joining portion of the reduction 31 and the shaft 32 is urged against a concave mouth of the bossed hole 41.

In a locked position of the bars 11, the raised portions of the ramps 54 of the second actuation member 50 are engaged with the raised portions of the ramps 63 of the first actuation member 60, the pin 74 is disposed at one end of the slot 67 so as to urge against the inner surface 76 of the first curved member 70, one bar 11 is locked by the curved outer surface 73 of the first curved member 70, and the other bar 11 is locked by the curved outer surface 83 of the second curved member 80.

Figure 7:
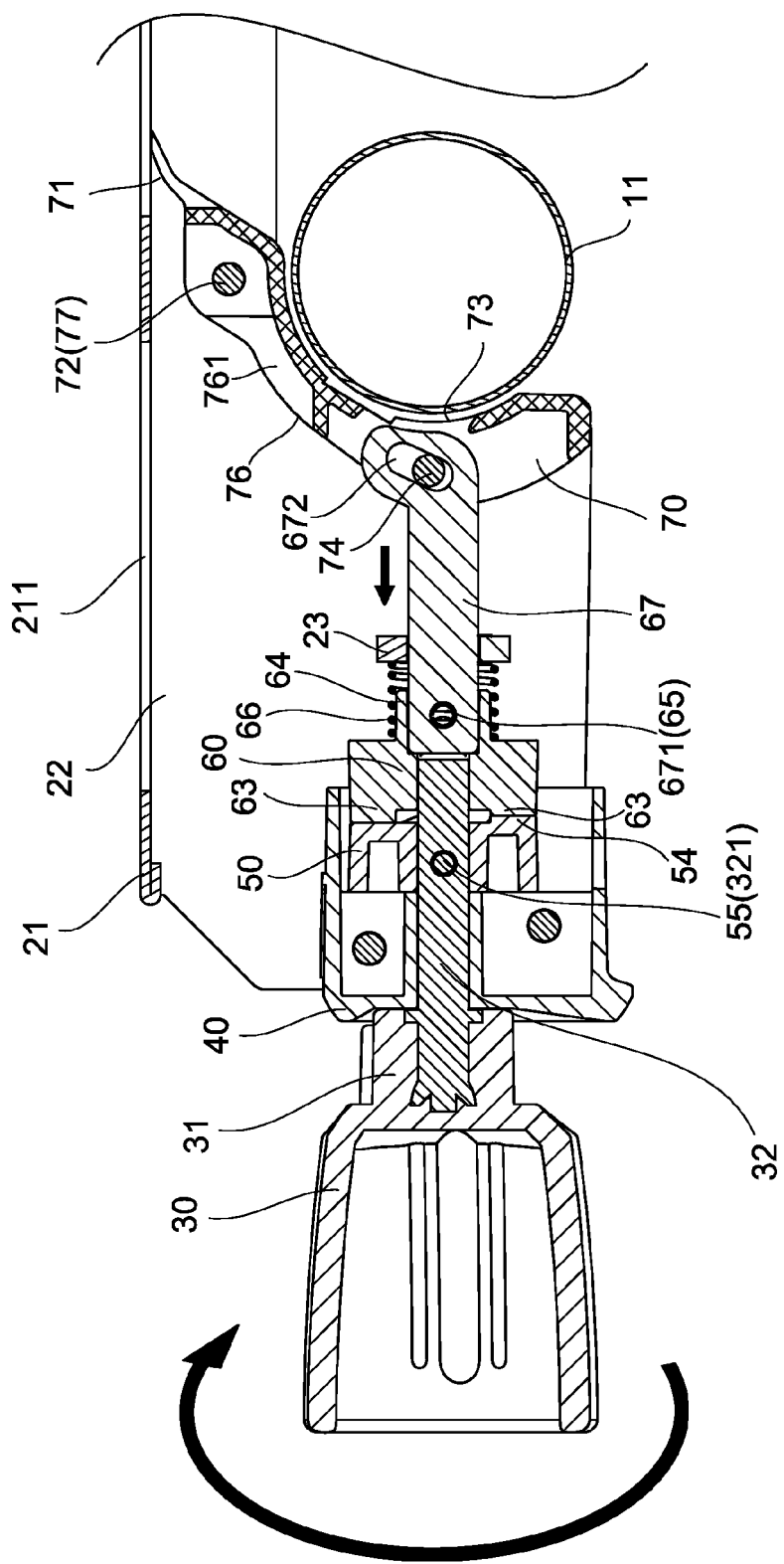
FIG. 7 is a view similar to FIG. 6 showing a counterclockwise rotation of the knob to unlock the bar.
Figure 8:
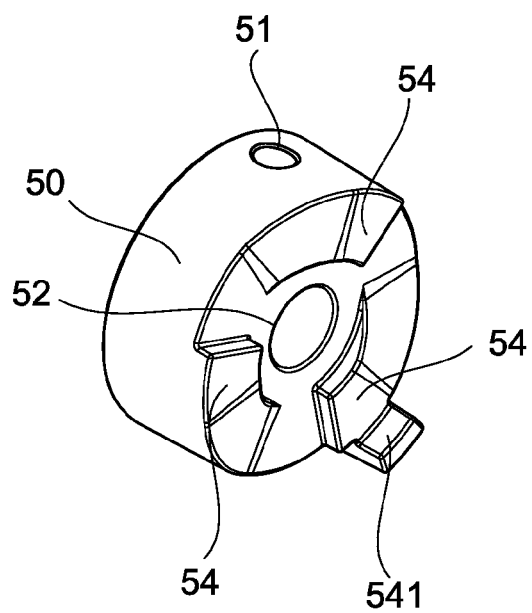
FIG. 8 is a perspective view of the second actuation member.
Figure 9:
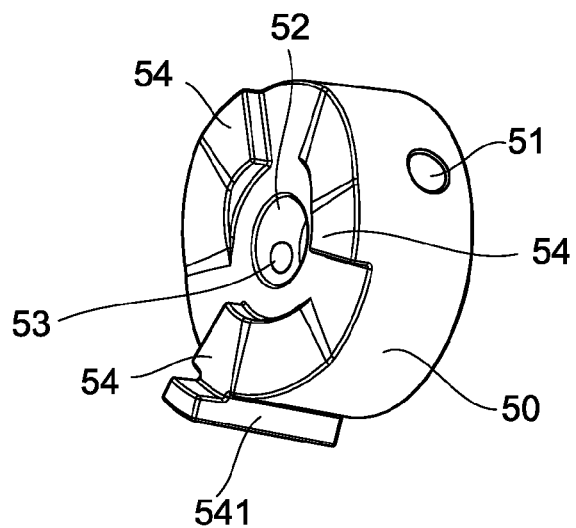
FIG. 9 is another perspective view of the second actuation member.
Figure 10:
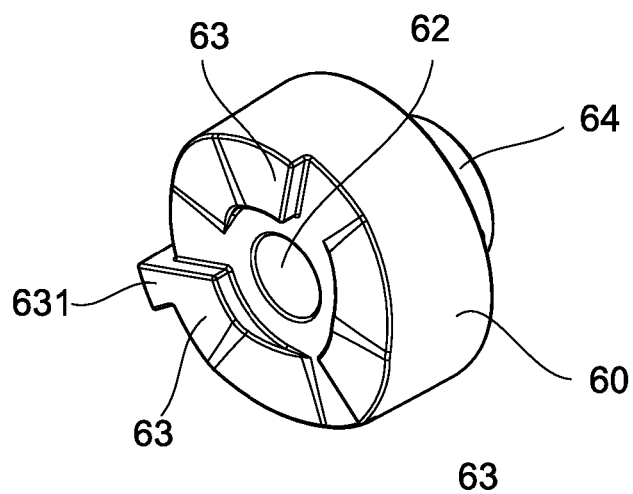
FIG. 10 is a perspective view of the first actuation member.
Figure 11:
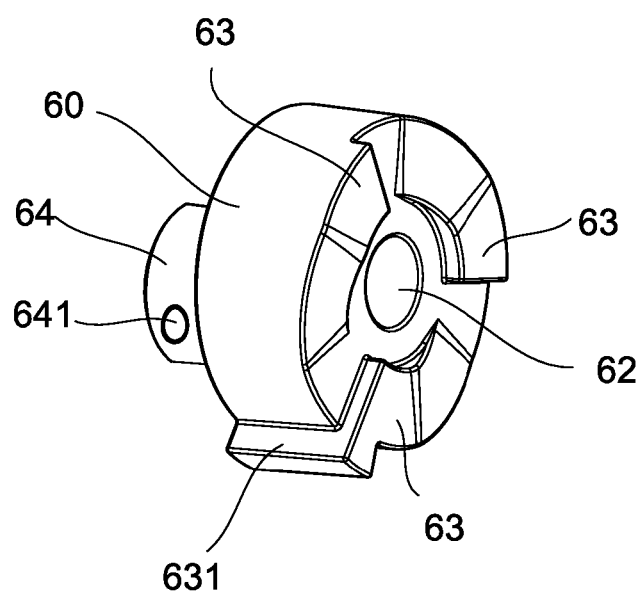
FIG. 11 is another perspective view of the first actuation member.

Bar sliding operation of the invention will be discussed in detail below. First, a user may pull the pin 25 a small distance to cause the disc member 26 to clear out of the well 842, thereby unlocking the other bar 11. Next, the user may clockwise rotate the knob 30 (see FIG. 6). Thus, the recessed portions of the ramps 54 of the second actuation member 50 are engaged with the raised portions of the ramps 63 of the first actuation member 60. The first actuation member 60 moves toward the first stop member 23 with the torsion spring 66 being compressed. And in turn, the link 67 moves toward the other end of the slot 672 to urge against the inner surface 76 of the first curved member 70, and the outer surface 73 of first curved member 70 being pulled outward away from the adjacent bar 11. At this time, the bracket assembly 20 is clamped by the first curved member 70 and the second curved member 80 from left and right directions to fasten the adjacent bars 11, thereby fastening the bracket assembly 20 and the adjacent bar 11 together. This has the benefit of increasing the reliability of assembly and increasing safety in operation. Further, as shown in FIG. 7, a counterclockwise rotation of the knob 30 unlocks the adjacent bar 11. And in turn, the first actuation member 60 moves further away from the first stop member 23 with the torsion spring 66 being expanded and the link 67 moves toward one end of the slot 672 to guide the downward movement of the ridges 762, thereby pulling the outer surface 73 of first curved member 70 outward away from the adjacent bar 11. And in turn, the slot 672 moves outward and thus the pin 74 is disposed in a position other than one end of the slot 672. As a result, one bar 11 is also unlocked. Specifically, the riser 541 of the second actuation member 50 and the riser 631 of the first actuation member 60 are used to prevent a clockwise or counterclockwise rotation of the knob 30 from being out of limit. That is, the knob 30 is allowed to rotate no more than a maximum angle so as to protect the ramps 54 of the second actuation member 50 and the ramps 63 of first actuation member 60 when they contact.

It is understood that above operation should be performed on both bracket assemblies 20 prior to sliding the bracket assemblies 20 along the bars 11.

Figure 12:
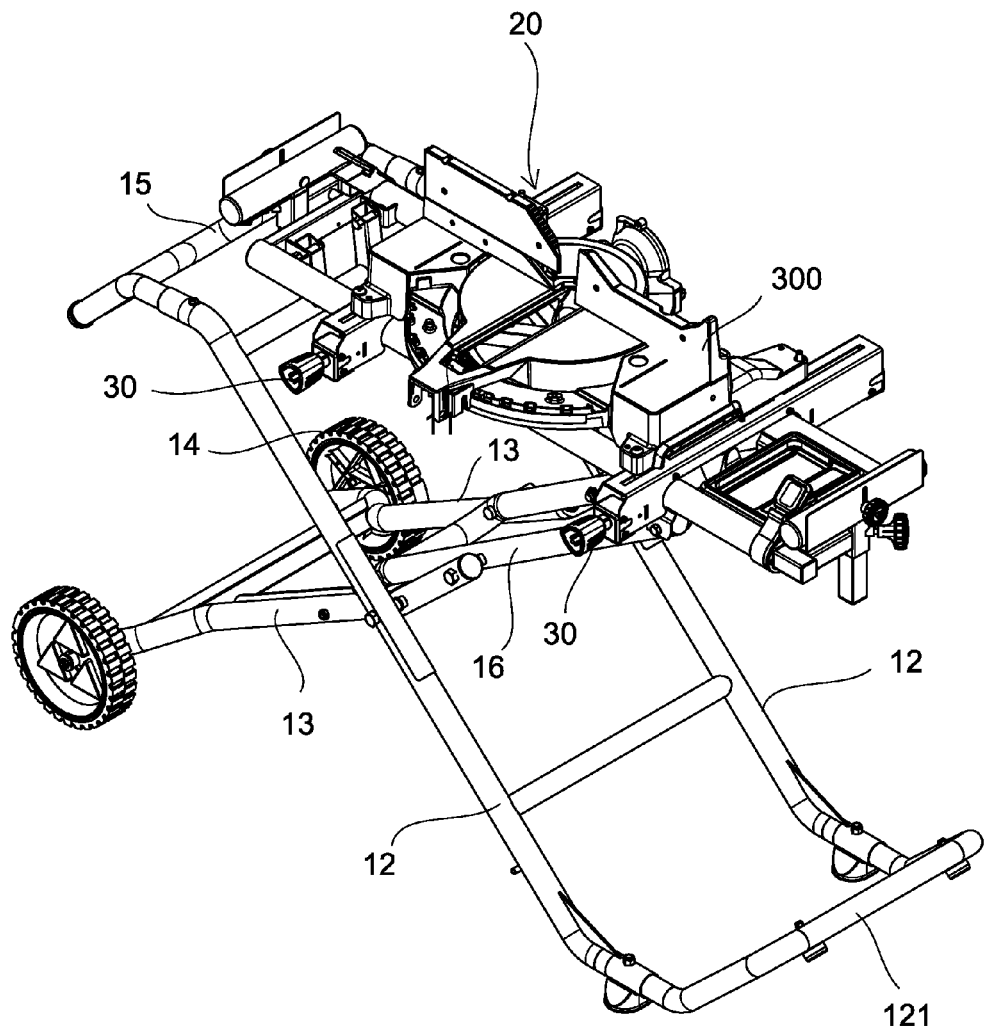
FIG. 12 is a perspective of the collapsible stand incorporating the bracket assemblies with a base of a circular sawing machine secured onto the bracket assemblies.
Figure 13:
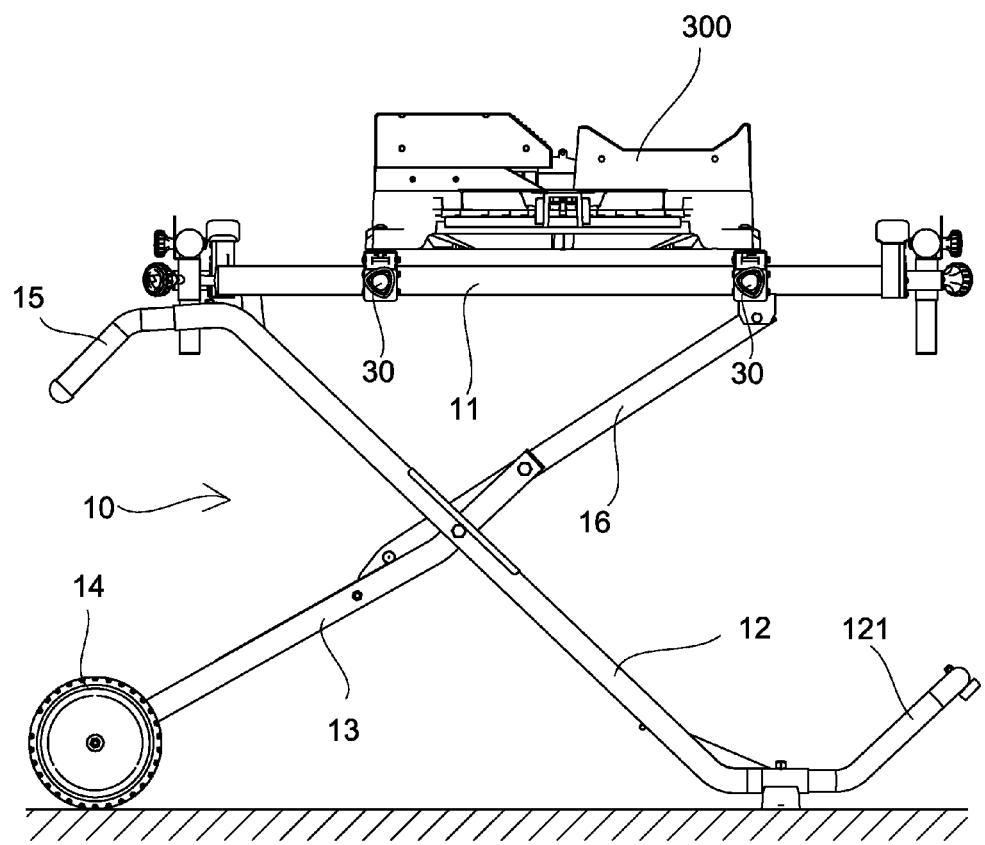
FIG. 13 is a side elevation of FIG. 12.
Figure 14:
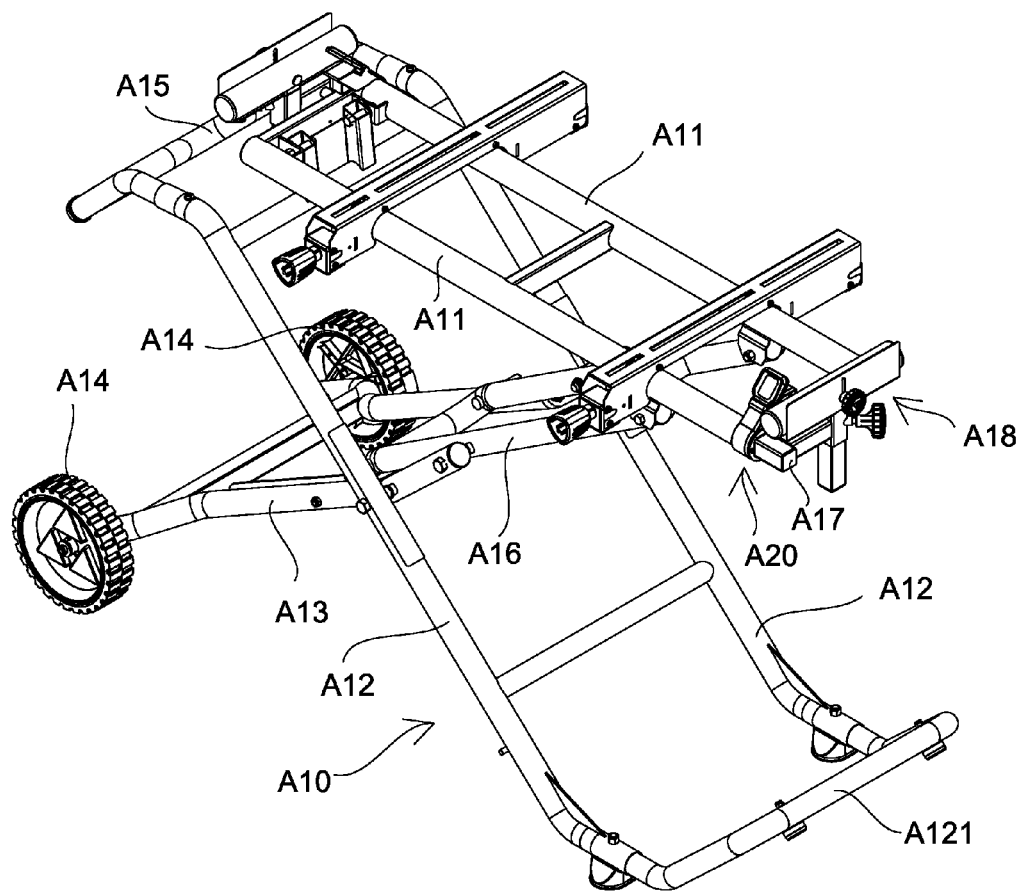
FIG. 14 is a perspective view of a collapsible stand incorporating a retaining device according to a second preferred embodiment of the invention.
Figure 15:
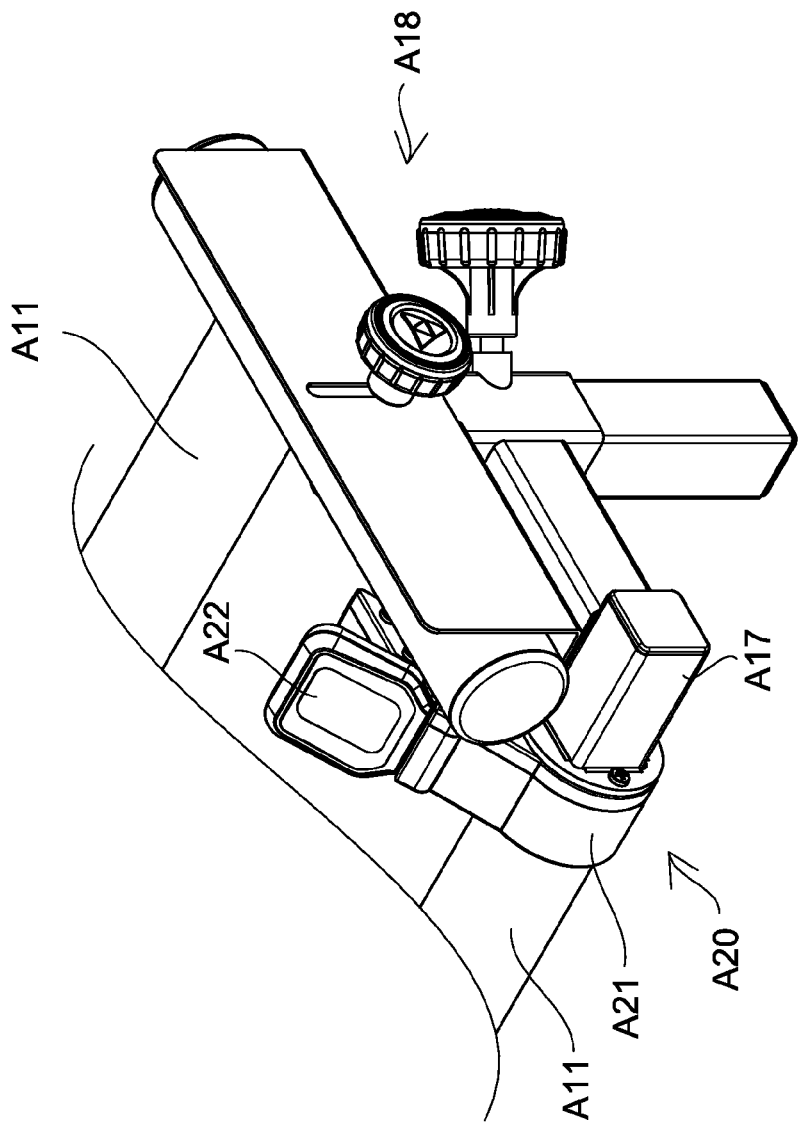
FIG. 15 is an enlarged view of the retaining device and adjacent components.
Figure 16:
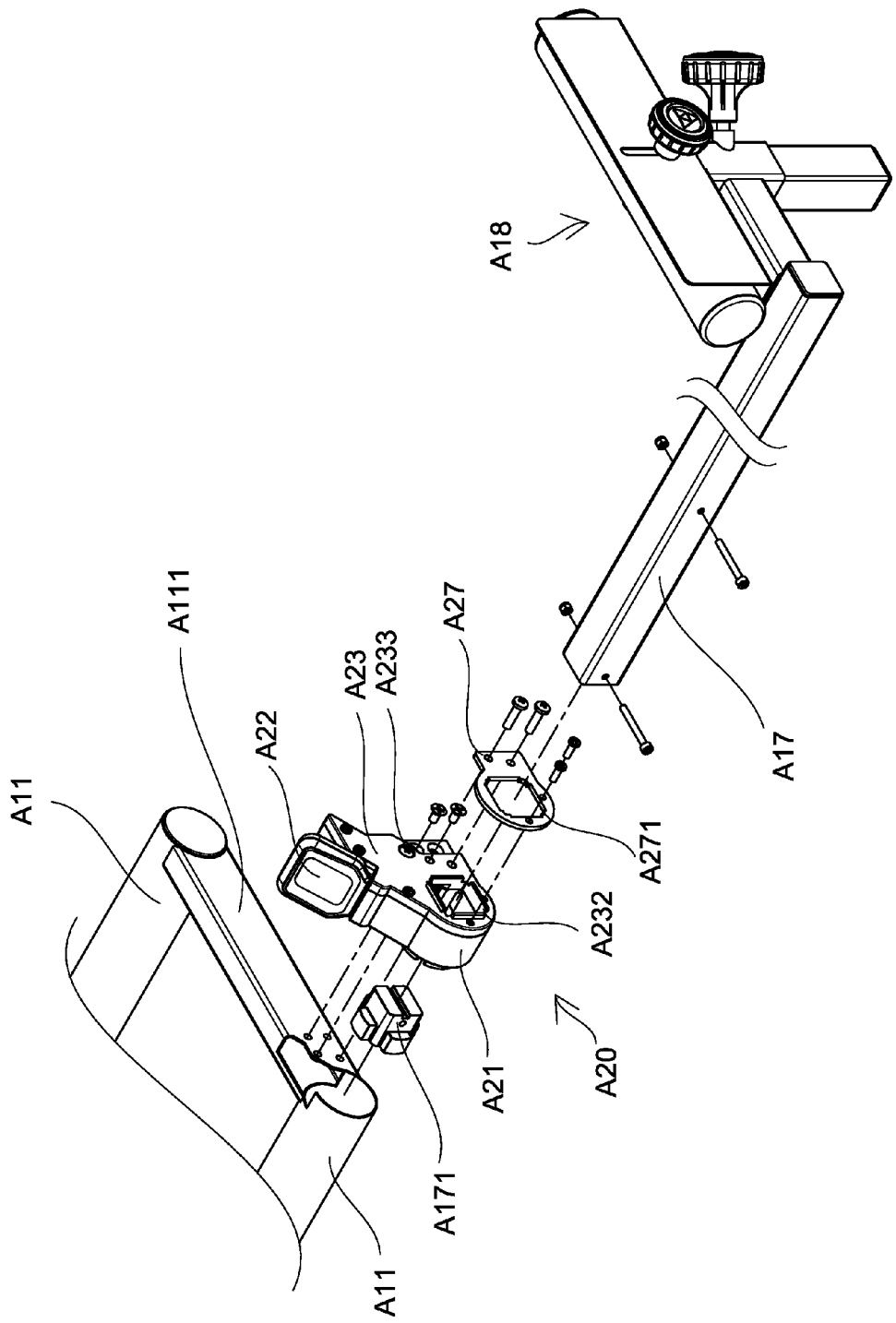
FIG. 16 is an exploded perspective view of the retaining device and the adjacent components.
Figure 17:
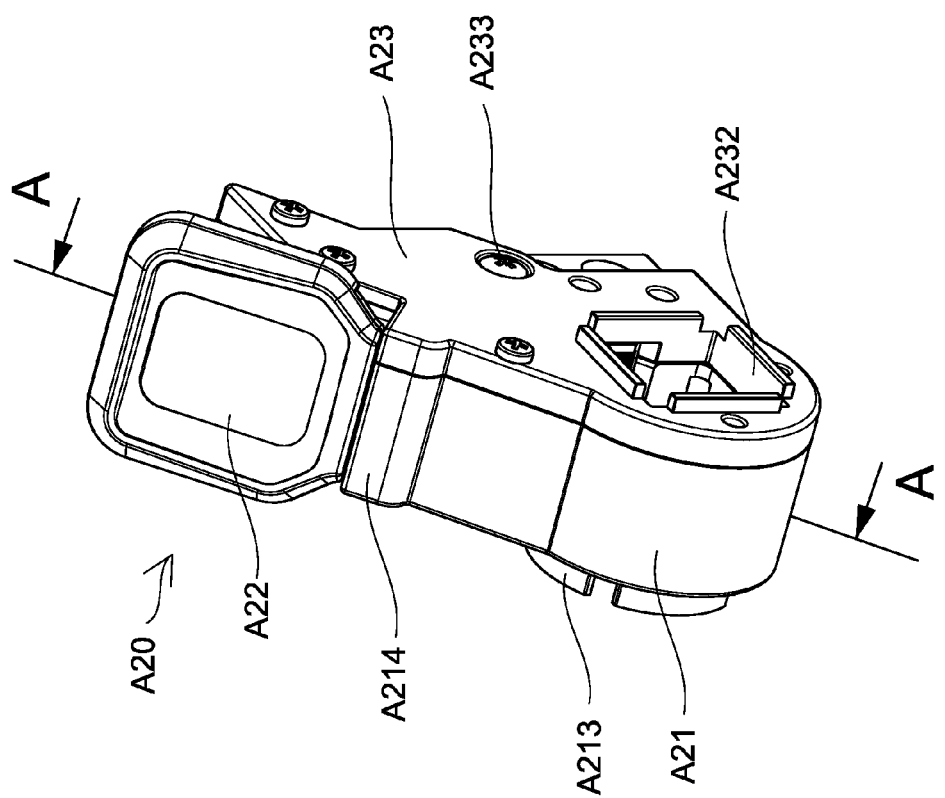
FIG. 17 is a perspective view of the retaining device.
Figure 18:
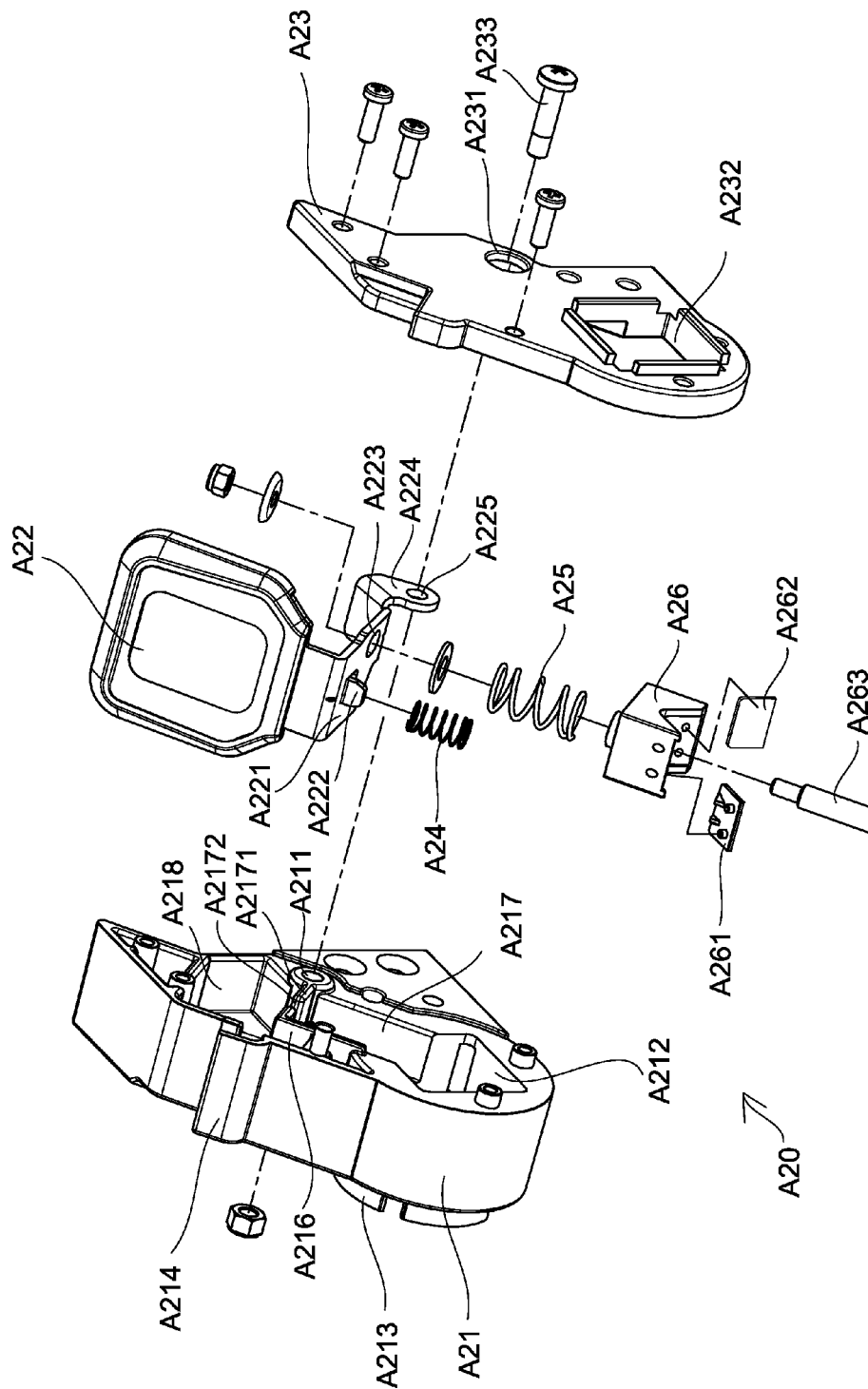
FIG. 18 is an exploded view of the retaining device.

As shown in FIGS. 12 and 13, a base 300 of a power tool (e.g., circular sawing machine) is mounted on the bracket assemblies 20. Thus, a sliding of the bracket assemblies 20 can achieve the purpose of sliding the circular sawing machine.

Referring to FIGS. 14 to 21, a collapsible stand A10 in accordance with a second preferred embodiment of the invention comprises the following components as discussed in detail below.

The stand A10 comprises two parallel first leg elements A12, a handle A15 at one ends of the leg elements A12, a U-shaped support element A121 at the other ends of the leg elements A12, two parallel second leg elements A13 having one ends connected to two wheels A14 respectively and the other ends pivotably secured to intermediate portions of the first leg elements A12 respectively, a U-shaped member A16 secured to two parallel members (not numbered) which are secured to the intermediate portions of the second leg elements A13 respectively, and two upper parallel bars A11 having one ends secured to a cross bar (not numbered) interconnecting the first leg elements A12 proximate to the handle A15, a bottom pivotably secured to the open ends of the U-shaped member A16, and a limit member A18 disposed at one ends of the bars A11. Further, a cross tube A111 is provided between one ends of the bars A11.

A retaining device A20 is provided at one end of one bar A11 and at one end of the cross tube A111. The retaining device A20 is the subject of the invention as discussed in detail below. The retaining device A20 comprises a housing A21, an intermediate first transverse hole A211 through the housing A21, a lower transverse channel A212 through the housing A21, an inclined first space A217 defined between the channel A212 and the first transverse hole A211, and a plurality of equally spaced flanges A213 on one end of the channel A212. One hollow end of the bar A11 can be put on the flanges A213 in a friction fit.

The retaining device A20 further comprises an inclined second space A216 parallel to the first space A217 in the housing A21, a third space A218 proximate to the upper portions of the first and second spaces A217, A216 in the housing A21, a bend A214 on an intermediate portion of an inclined outer surface of the housing A21, a bending member A2171 at an upper end of the first space A217, the bending member A2171 having a first through hole A2172 through a part thereof, and a limiting member A215 spaced from the bend A214.

The retaining device A20 further comprises a handle A22 including a bent mounting member A221, a tab A222 on the mounting member A221, a second through hole A223 through the mounting member A221, an ear member A224 on the mounting member A221, and a second transverse hole A225 through the ear member A224; a torsion spring 24 having one end put on the tab A222 and the other end urging against a bottom A2161 of the second space A216; a hollow member 26 including a first clamping plate A261 and a second clamping plate A262 both on an inner surface and the first clamping plate A261 is arranged at about 90-degree angle with respect to the second clamping plate A262; a pin A263 driven through the hollow member A26, a helical spring A25, the first through hole A2172, and the second through hole A223 with the helical spring A25 put on the pin A263 and biased between the hollow member A26 and the bending member A2171.

The retaining device A20 further comprises a side cover A23 including a rectangular opening A232, a third transverse hole A231, and a pivot A233 driven through the third transverse hole A231, the second transverse hole A225, and the first transverse hole A211 to pivotably fasten the ear member A224 and the housing A21 together. Further, the channel A212 has a rectangular longitudinal section so that a sliding tube A17 having a corresponding longitudinal section can be fitted in the channel A212 by passing the opening A232 and disposed in the hollow portion of the bar A11. Furthermore, the sliding tube A17 is clamped by the first clamping plate A261 and the second clamping plate A262. In addition, the portion of the mounting member A221 adjacent to the handle A22 passes through a gap A2141 and is provided in the third space A218 between the bend A214 and the limiting member A215.

Figure 19:
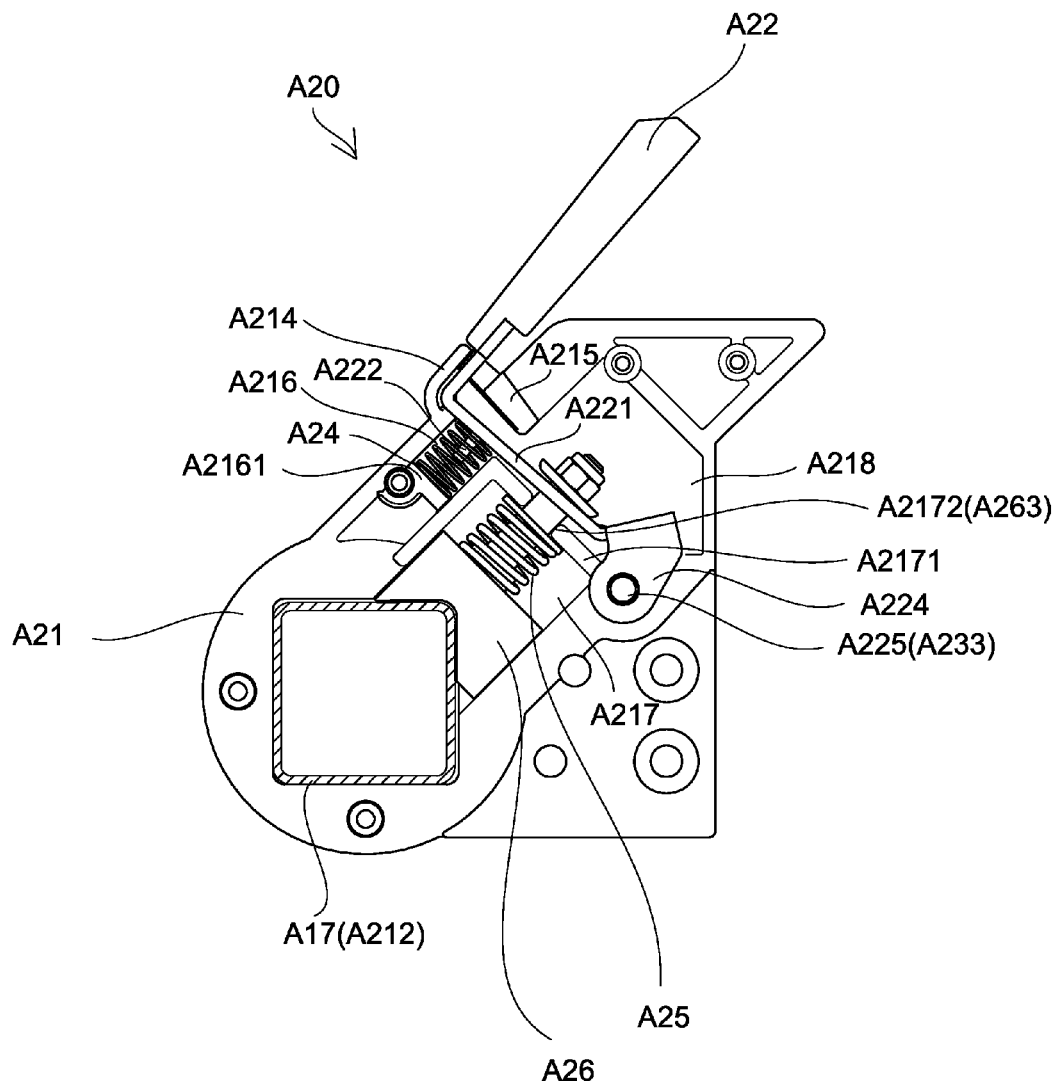
FIG. 19 is a sectional view taken along line A-A of FIG. 17.
Figure 20:
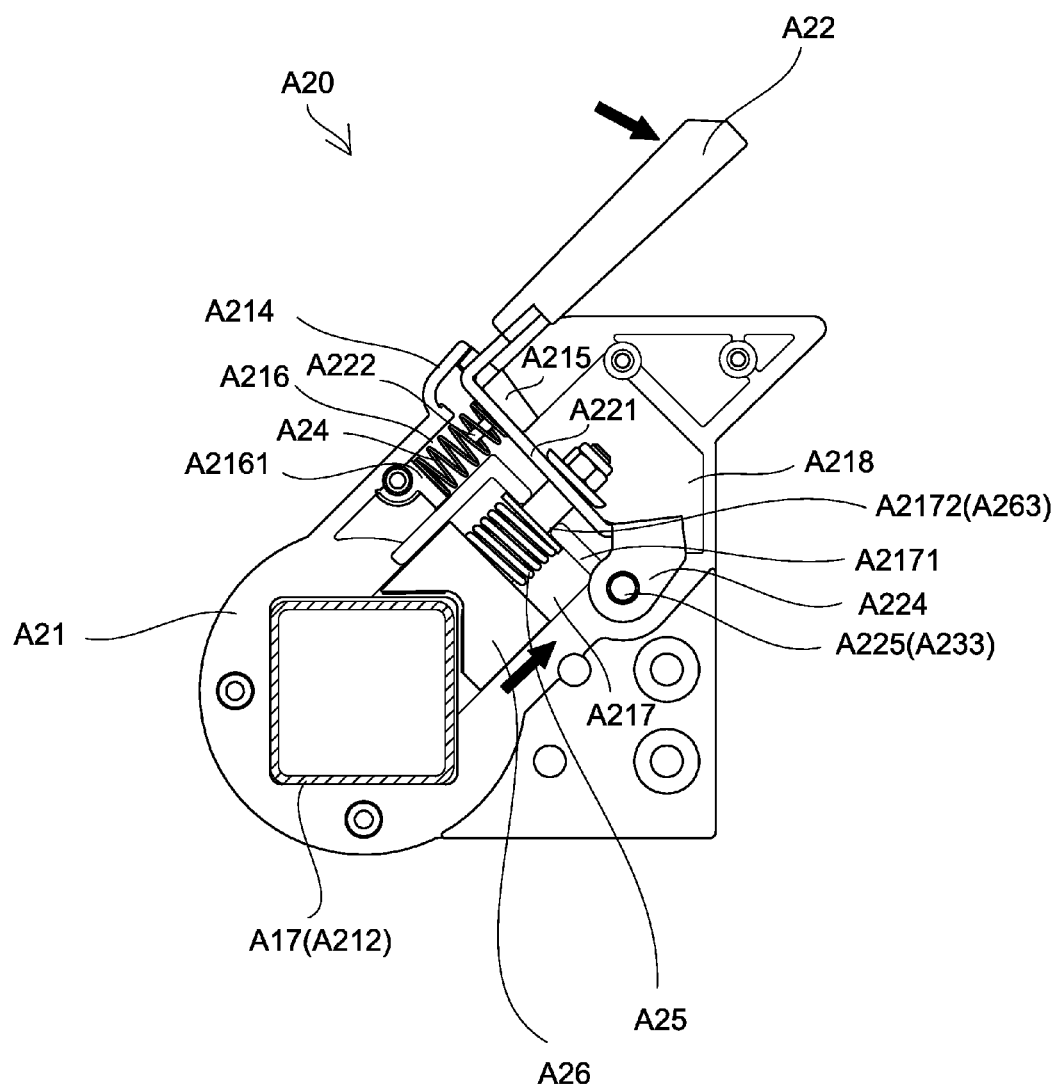
FIG. 20 is a view similar to FIG. 19 showing activation of the retaining device.
Figure 21:
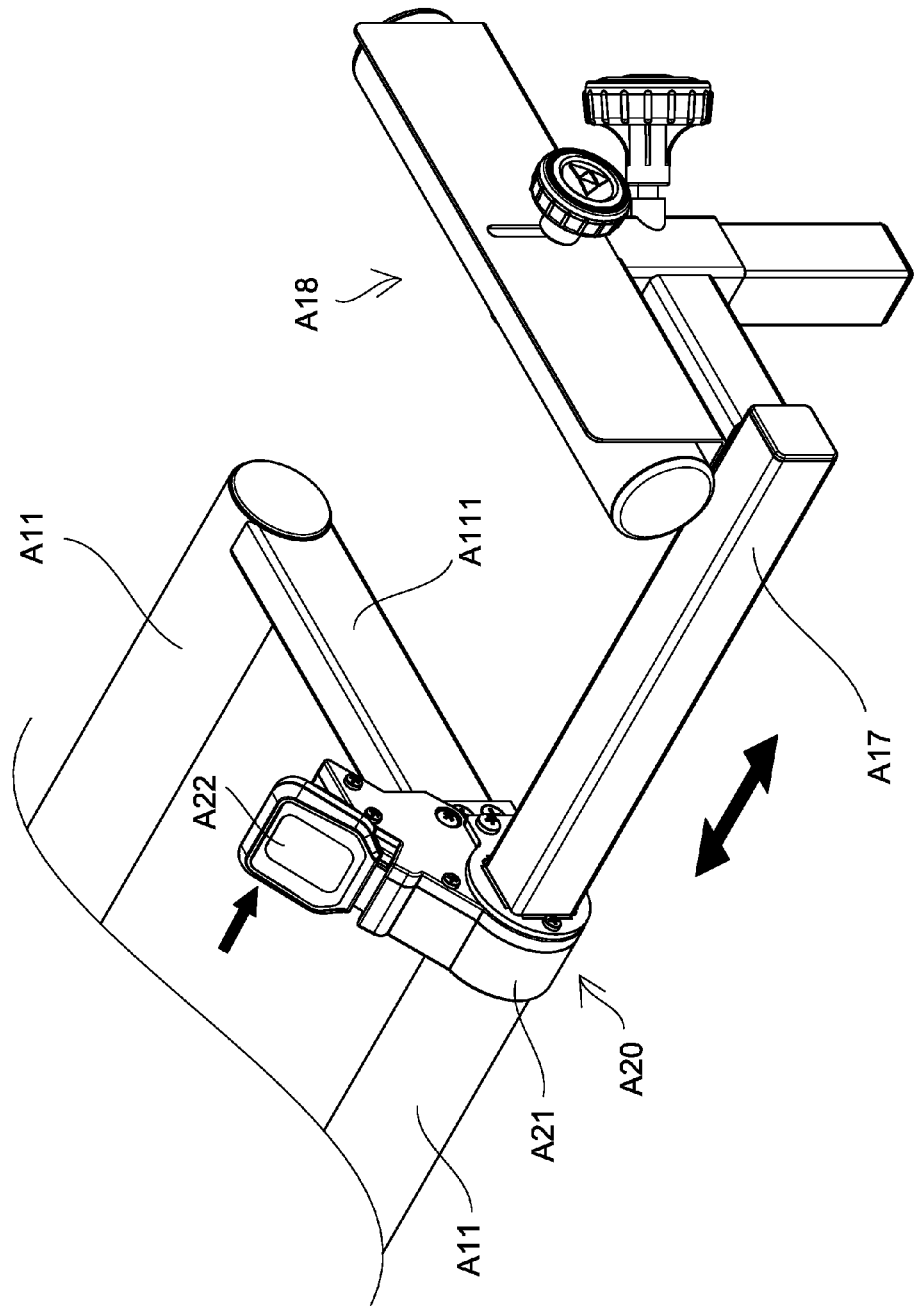
FIG. 21 is a perspective view showing the handle of the retaining device of FIG. 15 being pressed and the bar being prolonged with the retaining device on the bar.

An operation of the retaining device A20 is discussed in detail below. In FIG. 19, the spring A24 compresses and the spring A25 expands to lift the handle A22 of the retaining device A20 and press the hollow member A26. And in turn, the first clamping plate A261 and the second clamping plate A262 of the hollow member A26 urge against two inner surfaces of the sliding tube A17. As such, the retaining device A20 fastens the sliding tube 17. Further, in a length adjustment operation of the sliding tube A17, a user may clockwise pivot the handle A22 so as to pivot about the pivot A233 (see FIG. 20). And in turn, the spring A24 expands and the spring A25 compresses. Further, the first clamping plate A261 and the second clamping plate A262 no more clamp the sliding tube A17. As a result, the housing A21 is not locked. Thereafter, the user may push the limiting member A18 or pull the sliding tube A17 in which the retaining device A20 is secured to the cross tube A111 (i.e., without being slid or moved) by continuously pivotably pressing the handle A22 for adjusting a distance between itself and the limiting member A18 (see FIG. 21).

While the invention has been described in terms of preferred embodiments, those skilled in the art will recognize that the invention can be practiced with modifications within the spirit and scope of the appended claims.

What is claimed is:

1. A bracket assembly comprising, in combination:
an elongated shell having an inverted U-shaped longitudinal section and both ends open, the shell including first and second end members, a first stop member disposed across both sides of the first end member, and a second stop member disposed across both sides of the second end member and having a second hole;
a first curved member pivotably disposed on one end of a recessed bottom of the shell and including two spaced top extensions engaging the bottom of the shell, and a curved outer surface engaging one bar mounted on a collapsible stand;
a second curved member pivotably disposed on the other end of the bottom of the shell and including two spaced top extensions engaging the bottom of the shell, and a curved outer surface engaging an other bar mounted on the collapsible stand;
a fastener driven through the second hole of the second stop member to releasably lock the other bar mounted on the stand;
a link including a slot at one inclined end, a first pin driven through the first curved member and the slot to fasten the first curved member and the link together, and a third hole at an other end;
a cylindrical first actuation member including a cylindrical protrusion at one end, a fourth hole through the protrusion, an axial channel, a plurality of ramps equally spaced on one end surface, and a riser on an outer surface formed with one of the ramps;

a cylindrical second actuation member including an axial channel, a plurality of ramps equally spaced on one end surface, a riser on an outer surface formed with both one of the ramps on one end surface and one of the ramps on the other end surface, a fifth hole on an outer surface and communicating with the channel, and an aperture on the outer surface, communicating with the channel, and aligned with the fifth hole wherein the protrusion is put on the other end of the link;

a biasing member put on the protrusion and biased between the first stop member and the first actuation member;

a first cap secured to the first end member and including a bossed hole projecting inward from a central portion of an outer surface; and a knob including a reduction projecting inward, a shaft extending inward from the reduction, and a sixth hole through the shaft and terminating at a peripheral surface of the shaft wherein the shaft is inserted through the bossed hole and the channel of the second actuation member to be proximate to the link, and a joining portion of the reduction and the shaft is urged against the bossed hole;

wherein in a locked position, raised portions of the ramps of the second actuation member engage with raised portions of the ramps of the first actuation member, and the first pin is disposed at one end of the slot, one bar is locked by the first curved member, and the other bar is locked by the second curved member; and wherein a pulling of the fastener unlocks the other bar, and a clockwise rotation of the knob causes recessed portions of the ramps of the second actuation member to engage the raised portions of the ramps of the first actuation member, causes the raised portions of the ramps of the second actuation member to engage recessed portions of the ramps of the first actuation member, and moves the first actuation member further away from the first stop member with the biasing member being expanded, the link being pulled outward away from one bar, and the slot moving outward to dispose the first pin in a position other than one end of the slot, thereby unlocking one bar.

2. The bracket assembly of claim 1, wherein the shell further comprises a plurality of aligned elongated slot members on a top.

3. The bracket assembly of claim 1, further comprising a second cap secured to the second end member.

4. The bracket assembly of claim 1, wherein the first curved member further comprises two ridges on an inner surface corresponding to two spaced lower holes wherein one end of the link disposed in the slot is pivotably disposed between the ridges, the ridges are disposed on the inner surface of the first curved member, in response to a movement of the link, the ridges limits a transverse movement of the link and guides an upward or downward movement of the link, the pin is driven through the lower holes, and the ridges and the slot hold the link and the first curved member together.

5. The bracket assembly of claim 1, wherein the second curved member further comprises a cavity on an inner surface, a lower well on the inner surface, and a disc member fitted in the well.

6. The bracket assembly of claim 1, wherein the first stop member includes a first hole, wherein the other end of the link is inserted through the first hole of the first stop member and the first stop member is between both ends of the link.

7. The bracket assembly of claim 1, further comprising a second pin driven through the fourth hole of the first actuation member and the third hole of the link to fasten the first actuation member and the link together.

8. The bracket assembly of claim 1, wherein the first curved member further comprises two spaced top extensions engaging the bottom of the shell.

9. The bracket assembly of claim 1, wherein the second curved member further comprises two spaced top extensions engaging the bottom of the shell.

10. The bracket assembly of claim 1, further comprising a third pin driven through the aperture, the sixth hole of the knob, and the fifth hole of the second actuation member to fasten the knob and the second actuation member together.

* * * * *